Figure 1:
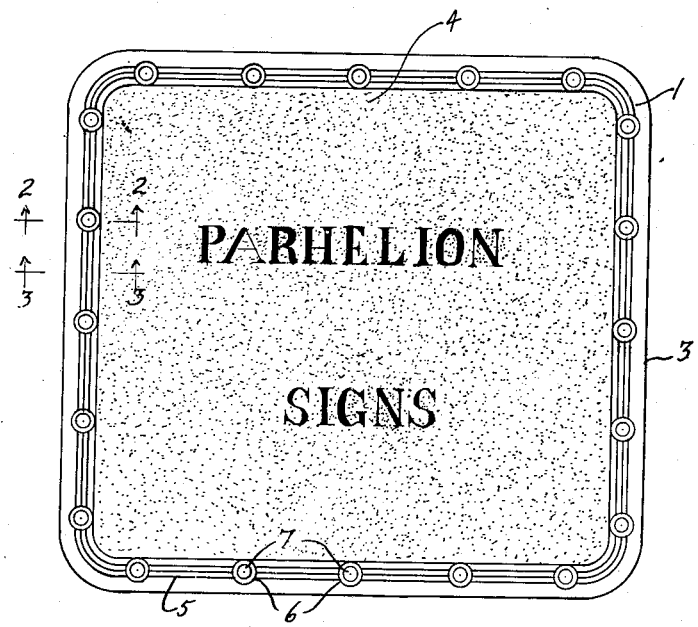

Feb. 29, 1944.   R. W. LUCE   2,343,068
RETRODIRECTIVE LIGHT-REFLECTING DEVICE
Filed March 7, 1941

INVENTOR.
Richard W. Luce
BY George T. Gill
Attorney

Patented Feb. 29, 1944

2,343,068

UNITED STATES PATENT OFFICE 2,343,068

RETRODIRECTIVE LIGHT-REFLECTING DEVICE

Richard W. Luce, Southport, Conn., assignor of one-half to George T. Gill, village of South Orange, N. J.

Application March 7, 1941, Serial No. 382,156

4 Claims. (Cl. 88—82)

The invention herein disclosed relates to a retrodirective light-reflecting device of the kind disclosed in my co-pending application for patent, Serial No. 320,267, filed February 23, 1940, now Patent No. 2,319,742, issued May 18, 1943.

In my aforesaid application for patent, there is disclosed a retrodirective light-reflecting device that is such as to appear the same at night, when illuminated by reflection of an incident beam of light, as it does in the daytime. This device includes a light-collecting and distributing element that consists of a relatively thin plate of moldable transparent material having a plane rear surface and a multiplicity of relatively small, closely related, spherical-sector, light-collecting lenses uniformly distributed over and formed integral with the front surface. These lenses are spaced apart, center to center, a distance equal to the diameter of the spheres of which the lenses form sectors. The plate is so thin, in the nature of a veneer, that for a sign of any size it is not sufficiently rigid as to be suitable without a backing or supporting plate.

The present invention contemplates a retrodirective light-reflecting device of this kind in which the lenses on the light-collecting element are substantially spherical sectors of less than one hundred and eighty degrees with adjacent lenses in contact, and the invention comprehends an arrangement for firmly securing the light-collecting element to a rigid backing plate but in such a manner as to permit relative expansion and contraction without buckling.

It has been determined that in a retrodirective light-reflecting device of this kind, suitable for roadside warning, directional and informative signs, a lens aperture of substantially a ninety degree spherical sector is sufficient for the desired angularity. One specific embodiment of the invention contemplates minute lenses of this aperture with adjacent lenses in contact and the lenses constituting the front surface of the reflective portion of the sign. In this way the maximum intensity of illumination in the reflected beam and the minimum distortion in changes in the light-reflecting characteristics are obtained. The light-reflecting element so constructed is fastened to a backing plate by fastening means extending through the light-collecting element but which permit relative expansion and contraction.

Such an embodiment of the invention is illustrated in the accompanying drawing and described in detail below.

Figure 2:
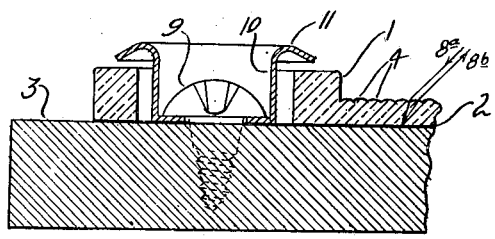
Figure 3:
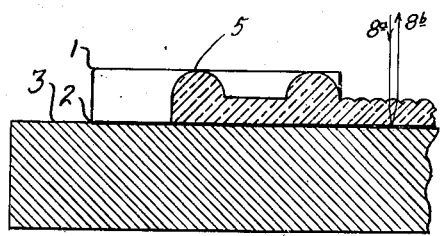
Figure 4:
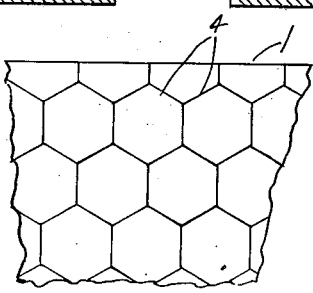

The drawing includes:

Fig. 1 which is an elevation of a sign constructed in accordance with this invention;

Fig. 2 which is an enlarged, fragmentary section taken on the line 2—2 of Fig. 1;

Fig. 3 which is an enlarged, fragmentary section taken on the line 3—3 of Fig. 1; and Fig. 4 which is an enlarged, fragmentary plan of a portion of the light-collecting element.

The sign illustrated in the drawing is one that is especially suitable for mounting at the side of a road traveled by automobiles. This sign includes a light-collecting and light-distributing element 1, an opaque light-reflecting material 2 at the rear of the light-collecting element and a backing or supporting plate 3 to which the light-collecting element is secured.

The light-collecting element is a relatively thin plate, approximately 0.056 inch in thickness, of moldable transparent material of a comparatively high index of refraction, such for example, as "Polystyrene." On the front surface of the plate there is a multiplicity of relatively small, spherical-sector lenses 4, indicated in Fig. 1 by stipples. These lenses are preferably ninety degree sectors of a sphere of a radius of three one hundred and twenty-eighths ($3/128$) of an inch. The circumambient edge of each lens forms a hexagon, as illustrated in Fig. 4. In this way adjacent lenses are in contact and the lenses constitute the front surface of the light-collecting element in the reflectively effective portion of the signs, the entire portion within the border 5. The border 5 consists of a pair of reenforcing ribs extending from the surface of the plate. These serve to strengthen and stiffen the plate. At spaced intervals along the border, there are bosses 6 having openings 7 that extend through the plate.

This light-collecting element is molded as a unit and has a plane rear surface. On this plane rear surface, the figures, letters or characters of the sign are painted (preferably with a pigment paint). Commonly, the letters or figures are of one color and the field of a different color. In such case, the letters or figures are first painted directly on to the back of the light-collecting element. After these have dried, the whole rear surface is painted with the color paint of the field or background. This paint constitutes the light-reflecting material 2. For certain purposes colored, transparent, plastic, such as colored "Polystyrene" may be used in molding the light-collecting element and decalcomanias may be used for forming the letters or characters. These may, with certain signs, be adhesively secured to the front surface of the light-collecting element.

The lenses 4 constitute light-collecting lenses and focus incident rays of light falling thereon at the rear surface of the plate. These rays, such as the incoming ray 8a, are reflected at the painted surface and are, by the refraction at the lens surface, returned, such as the ray 8b, back in substantially the same direction as the incident ray. By virtue of the spherical aberation and the diffused character of the reflecting surface, sufficient spread is obtained in the reflected beam for the reflected light to reach, for example, the eyes of the driver of an automobile, the beam from the headlights of which falls upon the sign.

With the sign above described, the figures, characters and lines which are painted on the back of the light-collecting plate are illuminated in the reflected beam pattern in substantially the same manner as they appear in daylight. The reflecting surface of the sign may have different light reflecting or light absorptive characteristics. For example, if a part of the background be red, the white light incident upon that particular portion of the sign will, with the exception of the red light rays, be absorbed by the background. The red rays will, however, be returned in substantially the same direction as the incident rays of white light. The lenses are so closely related that variations or transitions in the characteristics of the reflecting surface behind the light-collecting and distributing plate are indicated in the reflected beam with minuteness of detail and without observable distortions. It is because of this that the sign appears practically the same whether observed in the daytime or whether observed from behind a beam of light falling thereon such as the beam of light from the headlamps of an automobile. The lenses collect a series of pencils of light which are returned in the same general direction with a slight spread and the redirected pencils are so closely related that they appear to the eye as a general illumination of the sign.

For a roadside sign, the plane reflector surface, the diffusing character of the reflecting surface, the spherical lenses and the high index of refraction (1.6) of the resin "Polystyrene" provide the right combination. The plane reflector surface is located at the focal point of axial rays, or rather at the point of the greatest concentration of light from a point source at infinity. As the incident rays depart from the axis the reflecting surface is progressively farther away from the focal point of the lens. Thus, in a roadside sign, the distant incident rays are returned with a minimum divergence and as the light source approaches, the divergence increases with attendant greater angularity. The condition is desirable in roadside signs as a high intensity with a minimum of divergence provides illumination at a greater distance, while as the light source approaches greater angularity is desirable and this is secured by the greater divergence.

The light-collecting element with the painted rear surface is secured to the supporting plate 3 by means of screws, such as the screw 9. This supporting plate may be of either wood or metal, in the one case wood screws would be used and in the other machine screws. Within the opening 7 in each boss 6, there is a cup-shaped retaining element such as the retaining element 10. This retaining element is of smaller diameter than the opening in which it is received and the base butts against the surface of the backing plate. At the outer edge of the retaining element, there is a radially extending, resilient flange 11 that engages the light-collecting element and so retains the light-collecting element against the backing plate when the retaining element is secured to the backing plate. To this end there is an opening through the base of the retaining element through which a screw such as the screw 9 extends.

For fairly large signs, in addition to the securing means above described, the center of the light-collecting element may be cemented to the backing plate. In either event, there may be relative expansion and contraction of the light-collecting element with respect to the supporting plate without disturbing the effectiveness of the securing means or injuring the sign. Preferably the retaining elements are made of an aluminum alloy and colored to match the border. The screws used are preferably such that they cannot be loosened with an ordinary screw driver.

It will be obvious that various changes may be made by those skilled in the art in the details of the embodiment of the invention illustrated in the drawing and described in detail above within the principle and scope of the invention as expressed in the appended claims.

I claim:

1. A retrodirective, light-reflecting device of the kind described and suitable for a roadside directional sign, which sign comprises in combination a relatively thin plate of transparent moldable material having a plane rear surface and a multiplicity of relatively small, substantially spherical sector lenses on the front surface formed integral therewith, the lenses being sectors of spheres of approximately ninety degrees, adjacent lenses being in line contact and the thickness of the plate including the lenses, the radius of curvature of the lenses and the index of refraction of the material being optically related in the relation of fifty-six thousandths of an inch, three one hundred and twenty eighths of an inch and one and six tenths, and an opaque light-reflecting medium at the rear of the plate, whereby paraxial incident light is returned in the direction of the source with minimum divergence.

2. A retrodirective, light-reflecting device of the kind described and suitable for a roadside directional sign, which sign comprises in combination a relatively thin plate of transparent, moldable material having a plane rear surface and a multiplicity of relatively small, substantially spherical sector lenses on the front surface formed integral therewith, the lenses being sectors of spheres of approximately ninety degrees, adjacent lenses being in line contact, the lenses being uniformly distributed over the surface of the plate and each square inch containing not less than one thousand lenses, and the thickness of the plate including the lenses, the radius of curvature of the lenses and the index of refraction of the material being substantially optically related in the relation of fifty-six thousandths of an inch, three one hundred and twenty-eighths of an inch and one and six tenths, and an opaque light-reflecting medium at the rear of the plate, whereby paraxial incident light is returned in the direction of the source with minimum divergence.

3. For a retrodirective, light-reflecting device of the kind described, a light-collecting and directing element comprising in combination a relatively thin plate of moldable, transparent material having a plane rear surface and a multiplicity of relatively small, substantially spherical sector, light-collecting lenses on the front surface formed integral therewith, the lenses being sectors of spheres of approximately ninety degrees, adjacent lenses being in line contact and the thickness of the plate including the lenses, the radius of curvature of the lenses and the index of refraction of the material being optically related in the relation of fifty-six thousandths of an inch, three one hundred and twenty eighths of an inch and one and six-tenths, whereby for paraxial incident light there is the greatest concentration of light at the rear surface.

4. For a retrodirective, light reflecting device of the kind described, a light-collecting and directing element comprising in combination a relatively thin plate of moldable, transparent material having a plane rear surface and a multiplicity of relatively small, substantially spherical sector, light-collecting lenses on the front surface formed integral therewith, the lenses being sectors of spheres of approximately ninety degrees, adjacent lenses being in line contact, the lenses being uniformly distributed over the surface of the plate and each square inch containing not less than one thousand lenses, the radius of curvature of the lenses and the index of refraction of the material being related in the relation of fifty-six thousandths of an inch, three one hundred and twenty-eighths of an inch and one and six tenths, whereby for paraxial incident light there is the greatest concentration of light at the rear surface.

RICHARD W. LUCE.